United States Patent [19]
Kamiya

[11] Patent Number: 5,581,650
[45] Date of Patent: Dec. 3, 1996

[54] LEARNING DYNAMIC PROGRAMMING

[75] Inventor: Shin Kamiya, Nara, Japan

[73] Assignee: Sharp Kabushiki Kaisha, Osaka, Japan

[21] Appl. No.: 272,109

[22] Filed: Jul. 7, 1994

Related U.S. Application Data

[63] Continuation of Ser. No. 798,574, Nov. 26, 1991, abandoned.

[30]   Foreign Application Priority Data

Nov. 27, 1990 [JP] Japan .................................. 2-327785

[51] Int. Cl.$^6$ ...................................................... G10L 9/00
[52] U.S. Cl. ........................................................ 395/2.5
[58] Field of Search ............................... 395/2.5; 381/43

[56]          References Cited

U.S. PATENT DOCUMENTS

| | | | |
|---|---|---|---|
| 3,700,815 | 10/1972 | Doddington et al. | 395/2.55 |
| 4,282,403 | 8/1981 | Sakoe | 381/43 |
| 4,326,101 | 4/1982 | Sakoe | 395/2 |
| 4,348,553 | 9/1982 | Baker et al. | 395/2.5 |
| 4,446,531 | 5/1984 | Tanaka | 381/42 |
| 4,467,437 | 8/1984 | Tsuruta et al. | 395/2.5 |
| 4,530,110 | 7/1985 | Nojiri et al. | 395/2.5 |
| 4,559,604 | 12/1985 | Ichikawa et al. | 381/43 |
| 4,570,232 | 2/1986 | Shikano | 381/43 |
| 4,571,697 | 2/1986 | Watanabe | 381/43 |
| 4,601,054 | 7/1986 | Watari et al. | 381/42 |
| 4,608,708 | 8/1986 | Watanabe | 381/43 |
| 4,712,243 | 12/1987 | Ninomiya et al. | 381/43 |
| 4,742,547 | 5/1988 | Watanabe | 395/2.5 |
| 4,751,737 | 6/1988 | Gerson et al. | 395/2.5 |
| 4,763,278 | 8/1988 | Rajasekaran et al. | 395/2.5 |
| 4,783,806 | 11/1988 | Nakamura et al. | 381/43 |
| 4,802,226 | 1/1989 | Watanabe | 395/2.5 |
| 4,852,172 | 7/1989 | Taguchi | 381/43 |
| 4,868,879 | 9/1989 | Morito et al. | 381/43 |
| 4,901,352 | 2/1990 | Watari | 381/43 |
| 4,910,783 | 3/1990 | Nakagawa et al. | 381/43 |
| 4,975,962 | 12/1990 | Oka | 381/43 |
| 5,073,939 | 12/1991 | Vensko et al. | 395/2.5 |
| 5,121,465 | 6/1992 | Sakoe | 395/2 |
| 5,181,256 | 1/1993 | Kamiya | 395/21 |
| 5,313,555 | 5/1994 | Kamiya | 395/2.42 |
| 5,457,770 | 10/1995 | Miyazawa | 395/2.64 |

OTHER PUBLICATIONS

T. Watanabe et al., "Speaker–Independent Word Recognition Using Dynamic Programming Matching with Statistic Time Warping Cost", NBC Corporation, Oct. 1987, pp. 67–68.

Sakoe et al., ("Dynamic Programming Algorithm Optimization for spoken word recognition", IEEE transactions on Acoustics, speech, and Signal Processing, vol. ASSP–26, No. 1, Feb., 1978, pp. 43–49).

*Primary Examiner*—Ayaz R. Sheikh
*Assistant Examiner*—Vijay B. Chawan
*Attorney, Agent, or Firm*—David G. Conlin; George W. Neuner

[57]          ABSTRACT

This dynamic programming includes a learning mode and an evaluation mode. In the learning mode, an accumulated DP path matrix is determined by a DP matching among a plurality of learning pattern vectors belonging to one category and a plurality of learning pattern vectors belonging to a similar category similar to the foregoing category and a standard pattern vector belonging to the foregoing category. Then path weights are calculated depending on the values of each element of the accumulated DP path matrix. In the evaluation mode, for performing a DP matching between evaluation pattern vectors and the standard pattern vector, a distance between elements of the above two pattern vectors is calculated with weighting by the above path weight. Thus, the optimum path in the evaluation mode is modified toward a frequent optimum path composed of a series of elements having high values in the foregoing accumulated DP path matrix.

4 Claims, 4 Drawing Sheets

5,581,650

LEARNING DYNAMIC PROGRAMMING

This is a continuation of application Ser. No. 07/798,574 filed on Nov. 26, 1991 now abandoned.

BACKGROUND OF THE INVENTION

1. Field of the Invention

The present invention relates to improvement in the dynamic programing.

2. Description of the Prior Art

Generally, even if the same person vocalizes the same word, its length will vary each time and moreover it will be expanded or contracted in non-linear relation to the time axis. In brief, the length of a vocalized word involves irregular allowable distortions with respect to the time axis. This requires the time axis to be expanded or contracted so that like phonemes correspond to each other between the standard pattern and the characteristic pattern of an input voice. As a specific method to do this, the dynamic programing (DP) can be used. The DP matching is a method to do time expansion/contraction matching between a characteristic pattern and a standard pattern, an important method in speech recognition.

Recently the inventor and others have proposed a speaker adaptation method in which the DP matching is applied to treat characteristic pattern variation in voice signals due to the difference among individuals (Nakagawa, Kamiya, and Sakai "Recognition of word voices by unspecified speakers depending on simultaneous non-linear expansion and contraction of time-, frequency-, and strength-axes of audio spectrum," Journal of the Institute of Electronics and Communication Engineers of Japan, Vol. J64-D No. 2, Feb., 1981), the effectiveness of which was recognized experimentally.

The above-mentioned speaker adaptation method is a method in which the DP is used for frequency expansion/contraction matching based on the fact that the characteristic pattern variation due to the difference among individuals is primarily irregular allowable distortion with respect to the frequency axis. More specifically, when a simple vowel /a/ is uttered as a key word, the spectrum in the steady-state portion of the vowel /a/ is compared with the counterpart of the same vowel /a/ by a standard speaker by means of the DP matching on the frequency axis. Then the direction of shift on the frequency axis of the spectrum of the vowel /a/ of the input speaker from that of the standard speaker is detected, and the detection result, the direction of shift on the frequency axis of the spectrum of the simple vowel /a/ is utilized for speaker adaption in word recognition.

However, the above speaker adaptation method has a problem that when it is attempted to normalize not only the direction of shift on the frequency axis of the spectrum of the simple vowel /a/ but also the degree of the shift, even the difference in phonemes as well as the difference among individuals are unexpectedly normalized, with the result that there arises a case in which the word cannot be recognized even though the difference among individuals can be eliminated.

SUMMARY OF THE INVENTION

The object of the present invention is therefore to provide a dynamic programming which can normalize allowable distortions contained in a characteristic pattern belonging to a category within the necessary range without similar category differences being normalized, by learning the range of allowable distortions such as individual differences with previously taking similar category differences into consideration.

In order to achieve the aforementioned object, a dynamic programming with the use of learning according to the present invention is characterized in that, in a learning mode, a DP matching is performed between a plurality of learning pattern vectors belonging to the same category and a standard pattern vector belonging to the foregoing category to determine a plurality of DP path matrices in which optimum paths are represented in the form of a matrix pattern; while likewise a DP matching is performed between a plurality of learning pattern vectors belonging to a similar category similar to the foregoing category and the foregoing standard pattern vector to determine a plurality of similar pattern DP path matrices in which optimum paths are represented in the form of a matrix pattern; in determining an accumulated DP path matrix from the value of the same element in the plurality of DP path matrices and the value of the corresponding element in the plurality of similar pattern DP path matrices, the values of the elements in the DP path matrices are added while the values of the elements in the similar pattern DP path matrices are subtracted, thus determining the value of each element in the accumulated DP path matrices, and a path weight is calculated according to a specified rule based on the resulting values of the elements in the accumulated DP path matrices, and that, in an evaluation mode, when a distance between elements of an input evaluation pattern vector and the standard pattern vector is calculated for a DP matching thereof, weighting is performed to a distance between the foregoing elements using the value of the resulting path weight corresponding to the elements.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now the present invention is described in detail with reference to the embodiment illustrated in the accompanying drawings.

Figure 1:
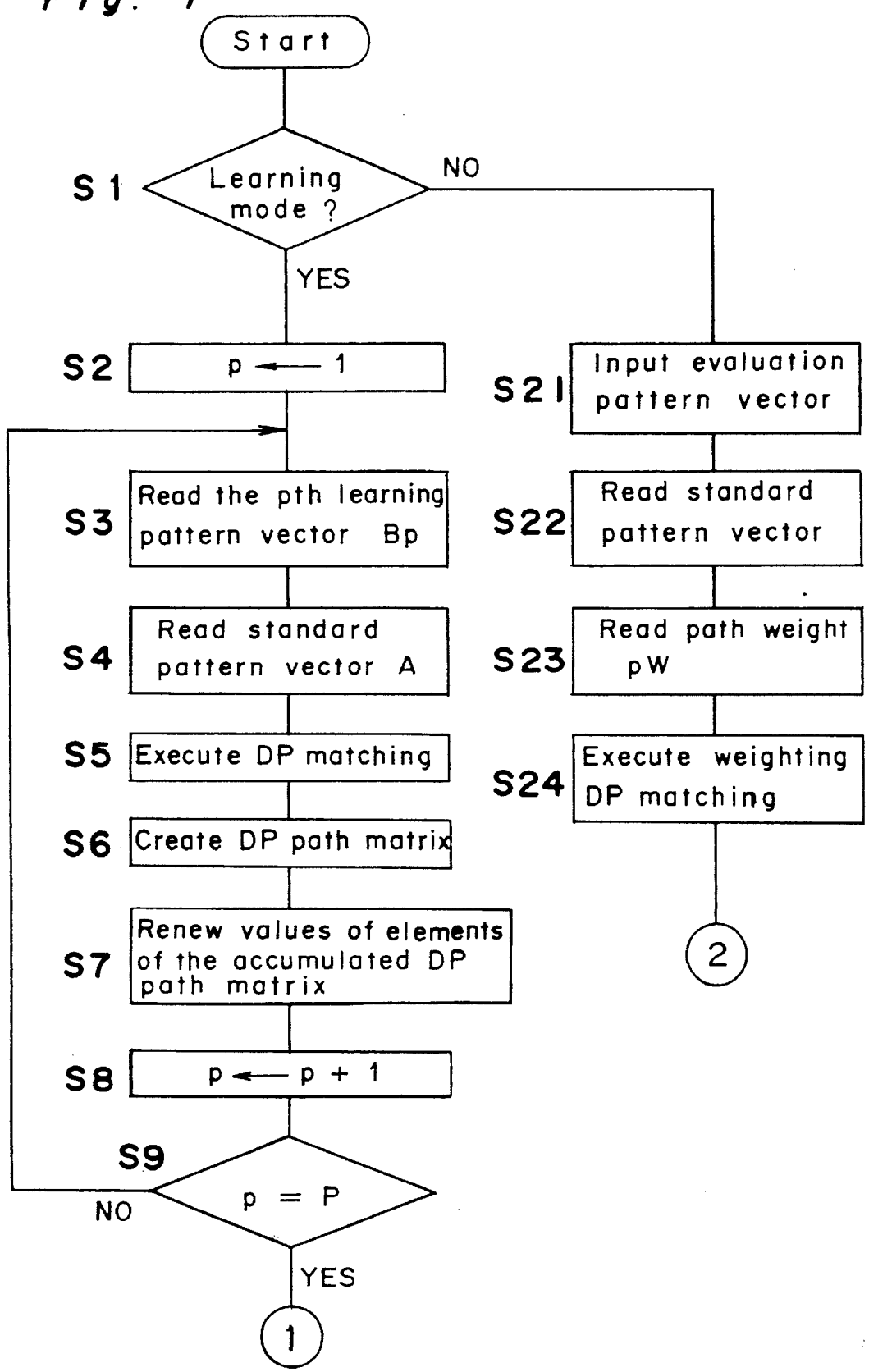
FIGS. 1 and 2 are a view showing a flow chart of a DP matching operating procedure according to one embodiment of the present invention.
Figure 2:
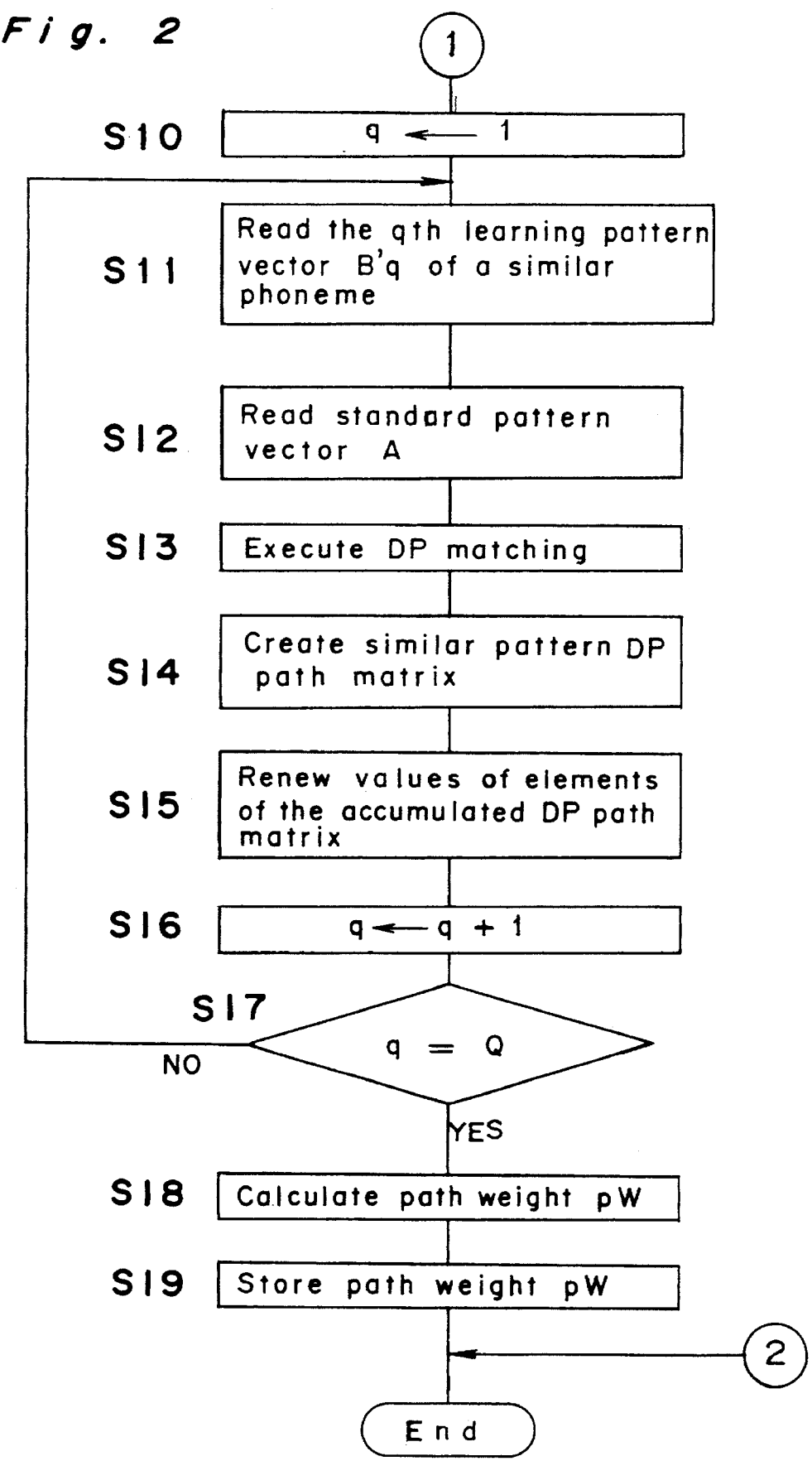

FIGS. 1 and 2 are a flow chart showing one embodiment of the operating procedure in a DP matching according to the present invention. Before the description of this flow chart proceeds, a frequency expansion/contraction DP matching embodying the present invention is explained in detail taking the case where a characteristic pattern based on voice waveform is used.

A characteristic pattern to be used in the aforementioned DP matching is created in the following manner. A voice waveform is analyzed by an L-channel filter bank, and sampled for every 10 ms (frame). The output value of the L channel for each frame is normalized by the sum of the squares of output values. Hereinafter, the channel series composed of normalized values in the channels obtained in this way is referred to as power spectrum. The power spectra pertinent to two voice waveforms thus obtained are designated as characteristic pattern vector A and characteristic pattern vector B, while element values representing the output values of the channels in the two characteristic pattern vectors are designated as element values ai and bj (where $1 \leq i, j \leq L$).

Figure 3:
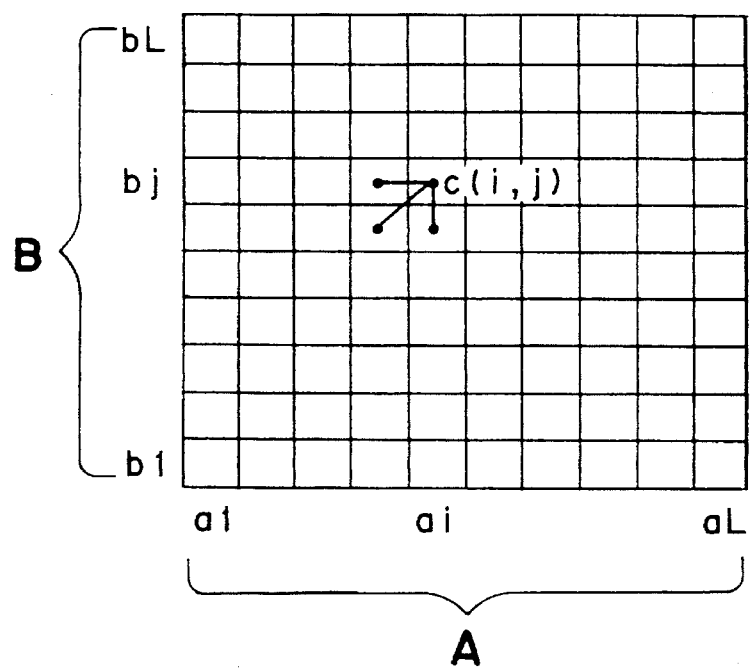
FIG. 3 is a view showing a model of a DP path matrix.

Now a plane is considered which is based on such characteristic pattern vectors A and B as shown in FIG. 3. The correspondence of frequencies to the two pattern vectors (power spectra) can be expressed in series (path) of lattice points c=(i,j) on the plane. Then the value of the sum G (hereinafter referred to as DP score) of the distances along the optimum path (hereinafter referred to as DP path) between the two pattern vectors can be determined by repeatedly calculating a partial sum g(i,j) as given by formula (1) within the range of a matching window by the DP matching with values of i and j increased.

$$g(i,j) = \min \begin{bmatrix} g(i,j-1) + d(i,j) \\ g(i-1,j-1) + 2d(i,j) \\ g(i-1,j) + d(i,j) \end{bmatrix} \quad (1)$$

$$G = g(L,L)/2L$$

where, $$d(i,j) = |ai - bj|$$

The smaller the value of the DP score calculated by formula (1), the smaller the sum of the distances along the DP path between the two pattern vectors; the two pattern vectors can be said to be ones which result in similar shapes when frequency expansion/contraction is performed within the range of the matching window.

This means that the DP score represents the degree to which the two patterns belong to the same category.

Figure 4:
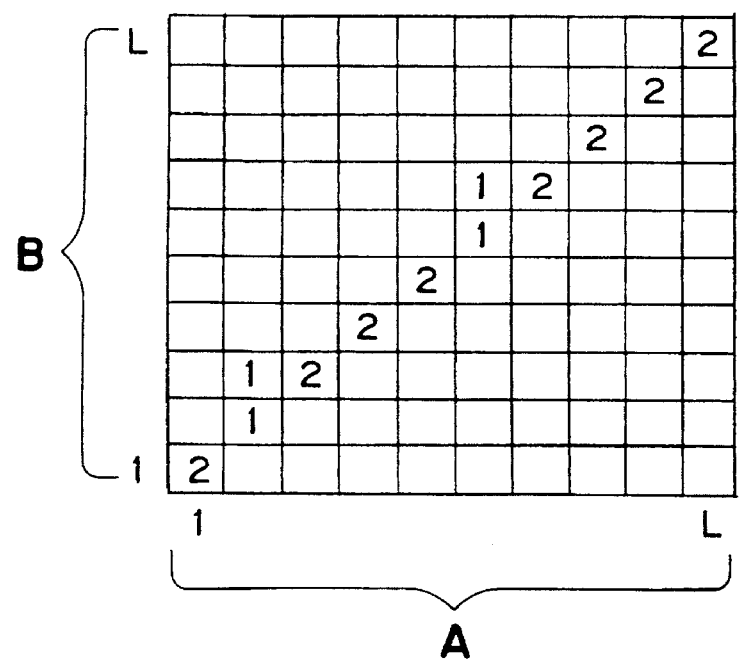
FIG. 4 is a view showing one example of a DP path matrix.

FIG. 4 shows an example of the series of lattice points c(i,j) which give a DP score determined from one characteristic pattern vector B out of a plurality of characteristic pattern vectors (learning pattern vectors) of learning patterns belonging to the same category and a characteristic pattern vector (standard pattern vector) A of a standard pattern belonging to the foregoing category; that is, the figure shows an example of the matrix for expressing the DP path (hereinafter such a matrix to express a DP path is referred to as DP path matrix). In this DP path matrix, "2" is given to the lattice point c(i,j) when one bj corresponds to one ai (i.e. there exists only one g(i,j)). Otherwise, when two bj's correspond to one ai (i.e. there exist two g(i,j)'s: $g(i,j_1) = g(i,j_2)$), "1" is given to lattice points $c(i,j_1)$ and $c(i,j_2)$; and "0" is given to a lattice point c(i,j) which is out of the path (now shown in FIG. 4).

In the DP path matrix of FIG. 4, there are a number of lattice points (i,j) to which "2"s are given on the diagonal line. Accordingly, it can be said that the patterns of the two power spectra A and B are well made corresponding to each other on the frequency axis.

Figure 5:
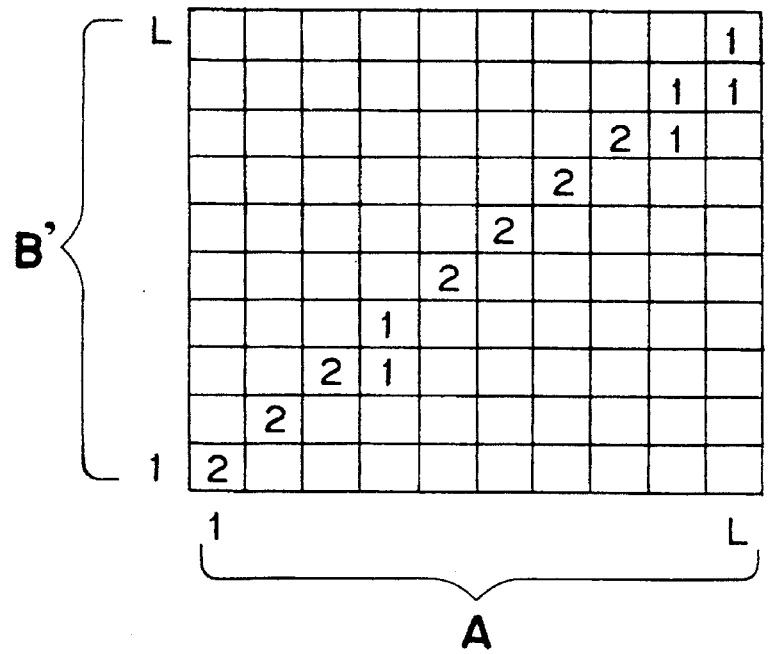
FIG. 5 is a view showing one example of a similar pattern DP path matrix.

FIG. 5 shows a DP path matrix (similar pattern DP path matrix) determined from one learning pattern vector B' out of a plurality of learning pattern vectors belonging to a category similar to the foregoing category and the standard pattern vector A belonging to the category. In this case, since there are a number of lattice points (i,j) to which "2s" are given also in the similar DP path matrix nearly on the diagonal line, it can be said that the patterns of the two power spectra A and B' are well made corresponding to each other on the frequency axis.

This means that the patterns of the two power spectra B and B' are also well made corresponding to each other on the frequency axis. Due to this, there arises a case where in evaluating the characteristic pattern vector of an input voice wave simply using the foregoing standard pattern vector belonging to the above category, the category to which the evaluation-objected characteristic pattern vector belonging to the above category belongs is evaluated as the above similar category.

As previously described, even characteristic pattern vectors belonging to the same phoneme category involves allowable distortions on the frequency axis depending on speakers. However, if a range of a matching window for DP matching is made larger than necessary to normalize allowable distortions on the frequency axis due to difference among individuals, even difference in phonemes is normalized as mentioned before. On the other hand, as shown in FIGS. 4 and 5, if a power spectrum belonging to a phoneme category is well made corresponding to a power spectrum belonging to its similar category on the frequency axis, there may be a case where the difference in phonemes is normalized even though the range of the matching window for DP matching is not made larger than necessary.

In view of the above cases, the present invention is so devised as to previously learn both the range of occurrence of DP path matrices concerning various characteristic pattern vectors belonging to the same category and the standard pattern vector representing the category and the range of occurrence of similar pattern DP path matrices concerning various characteristic pattern vectors belonging to the similar category and the standard pattern vector of the category (learning mode). Then, in performing the DP matching between a characteristic pattern vector to be evaluated and the foregoing standard pattern vector, the distance between the elements of the two pattern vectors is corrected according to the learning results, thus automatically setting the direction and range of expansion and contraction for expanding and contracting the frequency axis non-linearly (evaluation mode). The learning and evaluation modes are described in more detail below.

Learning mode

Assume that a power spectrum of a phoneme obtained from a standard speaker is designated as standard pattern vector A and one of power spectra of the same phoneme as the foregoing phoneme obtained from a plurality of speakers is as learning pattern vector B. The DP matching is performed between the standard pattern vector A and the learning pattern vector B to determine a DP path matrix. Further DP matching is performed with the learning pattern vector B renewed in succession, and the values of the same element in all the DP path matrices obtained are added together, thus determining an accumulated DP path matrix on all the speakers.

Additionally, one of power spectra of a similar phoneme similar to the foregoing phoneme obtained from a plurality of speakers is designated as learning pattern vector B'. Then like the above case, the DP matching is performed between the foregoing standard pattern vector A and the learning pattern vector B' with the learning pattern vector B' renewed in succession to determine a similar pattern DP path matrix, and the values of elements in the similar pattern DP path matrix are subtracted from the values of the corresponding elements in the accumulated DP path matrix, thus renewing the values of the elements in the accumulated DP path matrix.

Figure 6:
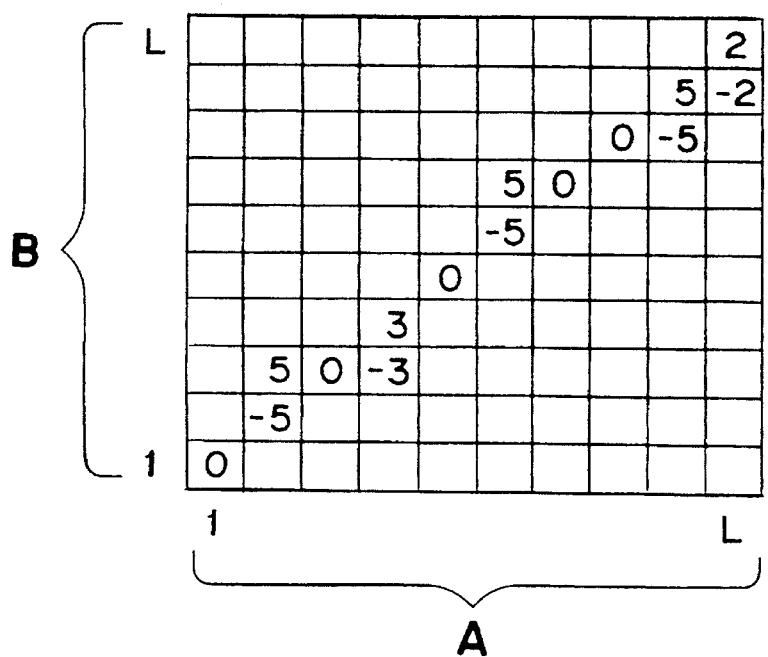
FIG. 6 is a view showing one example of an accumulated DP path matrix.

FIG. 6 shows an example of the accumulated DP path matrix thus obtained. A lattice point c(i,j) having a "positive" high value in such an accumulated DP path matrix can be said to be a lattice point frequently passed by DP paths obtained in a DP matching between characteristic pattern vectors of a plurality of speakers belonging to the same phoneme and the standard pattern vector of the phoneme (the lattice point hereinafter referred to as frequent lattice point). In contrast to this, a lattice point (i,j) having a "negative" value can be said to be a lattice point frequently passed by DP paths (similar pattern DP paths) between characteristic pattern vectors of a plurality of speakers belonging to the similar phoneme of the foregoing phoneme and the standard pattern vector of the phoneme (the lattice point hereinafter referred to as similar pattern frequent lattice point). In addition, a lattice point (i,j) to which "0" is described is a lattice point passed by the foregoing DP path and the similar pattern DP path at the same number of times. Meanwhile, a "blank" lattice point (i,j) which is actually "0" but to which description is omitted can be said to be a lattice point passed neither by the foregoing DP path nor the similar pattern DP path.

Even if the case is that, as described above, an adequate correspondence is made on the frequency axis between a standard pattern vector belonging to a phoneme category and a learning pattern vector belonging to the phoneme category and besides an adequate correspondence is made on the frequency axis between the standard pattern vector and a learning pattern vector belonging to the similar phoneme category of the foregoing phoneme category, yet, in comparison between FIG. 4 and FIG. 5, the position of the lattice point to which "1" is given differs when two bj's correspond to one ai. As a result, in the accumulated DP path matrix obtained from the voice waveforms of a plurality of speakers, a above-described slight difference between the DP path matrix and the similar pattern DP path matrix is emphasized as the frequent lattice point and the similar pattern frequent lattice point, as shown in FIG. 6.

When the DP matching is thus completed between all the learning pattern vectors and the standard pattern vector, weights equivalent to the inverts of the average values of the accumulated values (hereinafter, referred to as path weight) are calculated for each lattice point of the accumulated DP path matrix by formula (2):

$$pW(i,j)=M/[\{DPW(i,j)+K\}/\{DPW(i,1)+DPW(i,2)+\ldots+DPW(i,L) +L \times K\}]\ldots \quad (2)$$

where M is a constant (M>0), L and K are constants, pW(i,j) is a path weight, and DPW(i,j) is an element value in an accumulated DP path matrix.

Finally, the value of path weight pW obtained is stored in memory, terminating the learning.

Evaluation mode

A power spectrum is determined from the voice waveform of an unspecified speaker as a evaluation-object characteristic pattern. Then a DP matching is performed between the evaluation-object characteristic pattern vector (hereinafter, referred to as evaluation pattern vector) B and the standard pattern vector A in each phoneme used in the learning mode. The recurrence formula used in doing this is modified as formula (3):

$$g(i,j) = \min \begin{bmatrix} g(i,j-1)+d'(i,j) \\ g(i-1,j-1)+2d'(i,j) \\ g(i-1,j)+d'(i,j) \end{bmatrix} \quad (3)$$

where $$d'(i,j)=d(i,j)+pW(i,j)$$

In consequence, in the evaluation mode, path weight pW(i,j) pertinent to the foregoing standard pattern vector A is added to distance d(i,j) between the elements ai and bj of the two pattern vectors A and B. As a result, the value of path weight $pW(i_k, j_k)$ at lattice point $c(i_k, j_k)$ corresponding to the frequent lattice point in the foregoing accumulated DP path matrix is small, thus the distance between the element values $ai_k$ and $bj_k$ of the two pattern vectors corresponding to the lattice point $c(i_k, j_k)$ is kept from being made farther. Conversely, since the value of path weight $pW(i_l, j_l)$ at lattice point $C(i_l, j_l)$ other than the frequent lattice point is large, the distance between the element values $ai_l$ and $bj_l$ of the two pattern vectors corresponding to the lattice point $c(i_l, j_l)$ is made farther. In particular, the value of path weight $pW(i_m, j_m)$ at lattice point $c(i_m, j_m)$ corresponding to the similar frequent lattice point is extremely large, and therefore the distance between the element values $ai_m$ and $bj_m$ of the two pattern vectors corresponding to the lattice point $c(i_m, j_m)$ is made extremely farther.

By these steps, the DP path in the DP matching in the evaluation mode is approached toward the frequent lattice point, allowing the allowable distortion which the evaluation pattern vector has on the frequency axis to be normalized. In accomplishing this, the DP path in the DP matching in the aforementioned evaluation mode is positively made farther from the similar pattern frequent lattice point, thus ensuring that the allowable distortion on the frequency axis which an evaluation pattern vector belonging to a phoneme category has will not be normalized toward the similar phoneme category. Hereinafter, such DP matching using the path weight pW as described above is referred to as weighted DP matching.

In the above arrangement, when the frequent DP path composed of a series of the foregoing frequent lattice points has a certain width, the DP path in the evaluation mode is modified within the frequent DP path band. Accordingly, it can be avoided that the matching window for the DP matching in the evaluation mode is set to one larger than necessary and that the DP path pertinent to evaluation pattern vectors not belonging to the same category and to the standard pattern vector is set to lattice points out of the frequent DP path band. It follows accordingly that the range of the frequent DP path band can be construed as the range for normalizing allowable distortions on the frequency axis as it is, the frequent DP path band allowing the degree of normalization of allowable distortions on the frequency axis to be automatically set so as not to normalize even the similar category difference. Also, the modification of the DP path in the evaluation mode is done toward the frequent DP path band at all times, thus allowing the direction of normalizing allowable distortions on the frequency axis to be automatically set.

The above-described facts involves the importance of how the range of the foregoing frequent DP path band is set.

This range of the DP path band is dependent on how various forms of learning pattern vectors are used in the aforementioned learning mode. Therefore, when learning pattern vectors are created, it is advisable to use characteristic patterns in a large number of speakers who have various ages, sexes, linguistic environments, habits in vocalization, and the like.

Next the DP matching operating procedure in the present embodiment of the invention is described below with reference to the flow chart in FIGS. 1 and 2. FIGS. 1 and 2 are a flow chart on the learning or evaluation of one phoneme.

At step S1, it is discriminated whether the processing mode is the learning mode or not. As a result, if it is the learning mode, the operation goes to step S2. If it is the evaluation mode, the operation goes to step S21.

At step S2, "1" is set to the number of learning patterns p.

At step S3, the path learning pattern vector Bp in a phoneme to be an object is read.

At step S4, the standard pattern vector A of the phoneme to an object is read.

At step S5, the learning pattern vector Bp and the standard pattern vector A read out at the above steps S3 and S4 are subjected to DP matching.

At step S6, a DP path matrix is created according to the DP path obtained by the DP matching in the above step S5.

At step S7, each element value of the accumulated DP path matrix is renewed.

At step S8, "1" is added to the number of learning patterns p.

At step S9, it is decided whether the number of learning patterns P has reached the total number of the learning patterns p or not. As a result, if the DP matching has been completed to all the learning pattern vectors, the operation goes to step S10; if not, it returns to step S3, followed by the processing to the next learning pattern vector.

At steps S10 through S17, as in the above steps S2 through S9, a similar pattern DP path matrix is created from the DP matching between learning pattern vectors B'q of similar phonemes (Q in number) of the foregoing phoneme to be an object and the foregoing standard pattern vector A of the foregoing phoneme to be an object. Then the values of the elements of the foregoing accumulated DP path matrix are renewed depending on the values of the elements of the similar pattern DP path matrix. After that, the operation goes to step S18.

At step S18, the path weight pW is calculated according to the accumulated DP path matrix determined at the above step S15 by the formula (2).

At step S19, the path weight pW calculated at the above step S18 is stored in the memory, thus completing the learning to the phoneme to be an object.

At step S21, an evaluation pattern vector is input.

At step S22, a standard pattern vector of one phoneme is read.

At step S23, the path weight pW pertinent to the same phoneme as the foregoing standard pattern vector stored in the memory at the above step S19 is read.

At step S24, the weighting DP matching is performed to the evaluation pattern vector and the standard pattern vector read at the above step S22 using the value of the path weight pW read at the above step S23, thereby calculating the DP score. Then the calculated DP score is output, thus completing the evaluation of the evaluation pattern vector.

As shown above, in the present embodiment, first in the learning mode the DP matching is performed between the learning pattern vector belonging to the same category obtained from a plurality of speakers and the standard pattern vector belonging to the foregoing category, thereby determining a plurality of DP path matrices. Then an accumulated DP path matrix is determined by adding the value of the same element of each DP path matrix. Next the DP matching is performed between the learning pattern vector belonging to the similar category of the foregoing category and the standard pattern vector belonging to the foregoing category, thereby determining a plurality of similar pattern DP path matrices. Then the values of the elements of the similar pattern DP path matrix are subtracted from the values of the corresponding elements of the accumulated DP path matrix, thereby renewing the values of the elements of the accumulated DP path matrix. When the DP matching is terminated to all the learning pattern vectors in this way, the path weight pW is calculated according to the element values of the accumulated DP path matrix.

On the other hand, in the evaluation mode, the weighting DP matching is performed between an input evaluation pattern vector and the standard pattern vector belonging to one category with the path weight pW pertinent to the category, thereby weighting the distance between elements of the evaluation pattern vector and the standard pattern vector. As a result, the lattice points in the evaluation mode are made farther from the similar pattern frequent lattice point in the accumulated DP path matrix obtained in the learning mode and also modified toward the frequent lattice point.

Further, in the learning mode, if various learning patterns including ones belonging to the similar category are used so that the frequent DP path composed of the above frequent lattice points has a certain width, the distance between the elements of the two pattern vectors corresponding to the outside of the frequent DP path band is made farther. As a result, the allowable distortions on the frequency axis in the evaluation pattern vectors are normalized within the range of the frequent DP path band.

In consequence, the DP matching between various learning patterns including the learning pattern belonging to the similar pattern and the standard pattern allows the previous learning of frequent occurrence points of the DP path on the DP path matrix as well as the range of the frequent occurrence points (the range of difference among individuals) and moreover learning of frequent occurrence points of the similar DP path on the similar pattern DP path matrix and the range of the frequent occurrence points (the range of difference in similar category). Further, the learning results in the evaluation mode are utilized so that the direction and degree of the normalization of the difference among individuals (allowable distortions on the frequency axis) due to the DP matching in the evaluation are automatically set so as not to normalize even the similar category difference. Therefore, according to the present invention, the difference among individuals can be normalized in a necessary range without the similar category difference being normalized.

In the flow chart of the learning operation procedure in the above embodiment, it may be arranged without no problems that previously stored learning patterns are not read but such patterns are input for each time.

The algorithm of the DP matching operation in the present invention is not limited to that in the above-described embodiment.

In the learning mode in the above embodiment, first DP path matrices are determined from the DP matching between a plurality of learning patterns belonging to the same category and the standard pattern belonging to the foregoing category, and further an accumulated DP path matrix is determined from the resulting DP path matrices. Subsequent to this, using the values of the elements of the similar DP path matrix determined by the DP matching between a plurality of learning patterns belonging to the similar category of the foregoing category and the foregoing standard pattern belonging to the foregoing category, the values of the elements of the foregoing accumulated DP path matrix are renewed. However, the present invention is not limited to the above described arrangement.

For example, it may be accomplished by the following way. That is, a plurality of learning patterns belonging to the same category and a plurality of learning patterns belonging to the same similar category are presented one by one in random order, and subjected to DP matching with the standard pattern belonging to the foregoing category. Then the value of each element of the DP path matrix obtained each time is added to the value of the corresponding element of the accumulated DP path matrix, while the value of each element of the similar pattern DP path matrix is subtracted from the value of the corresponding element of the accumulated DP path matrix, thus renewing the values of the corresponding elements of the accumulated DP path matrix.

In the description of the above embodiment, although frequency expansion/contraction matching is employed as an example of the DP matching to be used, the present invention is not limited to this. Instead, time expansion/ contraction matching or spatial position expansion/contraction matching or the like may be used depending on the contents of the allowable distortions which a characteristic pattern has. Also, for example, the time expansion/contraction matching and the frequency expansion/contraction matching may be used in combination.

Although the above embodiment has been described taking the case where characteristic patterns of input voice waveforms are recognized, the present invention is not limited thereto but may be used to recognize characteristic patterns of character images. In this case, the aforementioned space expansion/contraction matching may serve as the DP matching to be used.

As apparent from the above description, the dynamic programming with the use of learning of the present invention is so devised that, in the learning mode, an accumulated DP path matrix is determined in the above-described procedure by the DP matching among a plurality of learning pattern vectors belonging to one category and a plurality of learning pattern vectors belonging to the similar category and the standard pattern vector belonging to the foregoing category, path weights are calculated depending on the values of each element of the accumulated DP path matrix, and in the evaluation mode, for performing the DP matching between evaluation pattern vectors and the standard pattern vector, the distance between elements of the two pattern vectors is calculated with weighting by the above path weight. Thus, the optimum path in the evaluation mode is modified toward the frequent optimum path composed of a series of elements having high values in the foregoing accumulated DP path matrix.

In consequence, in the learning mode, if various learning patterns including the learning patterns belonging to the similar category are used to previously learn so that the foregoing frequent optimum path has a certain width, in the evaluation mode allowable distortions which the evaluation pattern vector has can be normalized without being directed toward the similar category, but done toward the above frequent optimum path band correctly within the range of the frequent optimum path band.

Therefore, according to the present invention, it is possible to previously learn the range of allowable distortions including the difference among individuals by taking the similar category difference into consideration using various learning patterns, and making use of the learning results, automatically set the degree of the normalization of the allowable distortions so as not to normalize even the similar category difference, thus allowing the allowable distortions possessed by a characteristic pattern belonging to one category to be normalized in a necessary range without involving the similar category difference in the normalization.

The invention being thus described, it will be obvious that the same may be varied in many ways. Such variations are not to be regarded as a departure from the spirit and range of the invention, and all such modifications as would be obvious to one skilled in the art are intended to be included within the range of the following claims.

What is claimed is:

1. A method for dynamic programming in voice recognition with the use of learning; said method comprising:

A. a learning mode comprising the steps of:
  (1) performing a first DP matching between a plurality of learning pattern vectors belonging to a certain category and a standard pattern vector belonging to said certain category to determine a first plurality of DP path matrices in which optimum paths are represented in the form of a first matrix pattern;
  (2) performing a second DP matching between a plurality of learning pattern vectors belonging to a similar category similar to said certain category and said standard pattern vector to determine a second plurality of pattern DP path matrices, similar to the first plurality of DP path matrixes, in which optimum paths are represented in the form of a second matrix pattern;
  (3) determining an accumulated DP path matrix from values of elements in the first plurality of DP path matrices and values of the corresponding elements in the second plurality of similar pattern DP path matrices by adding the values of the elements in the first plurality of DP path matrices and subtracting the values of the elements in the similar pattern of the second plurality of DP path matrices, thus determining the value of each element in the accumulated DP path matrices, and
  (4) calculating a path weight according to a specified rule based on the resulting values of the elements in the accumulated DP path matrices, and B. an evaluation mode comprising the step of:
- (5) performing weighing to a distance between the elements using the value of the resulting path weight corresponding to the elements after a distance between elements of an input evaluation pattern vector and the standard pattern vector is calculated for a DP matching thereof.

2. The method for dynamic programming with the use of learning claimed in claim 1, wherein the standard pattern vector is a power spectrum of a phoneme obtained from a standard speaker, the learning pattern vector is one of power spectra of the same phoneme as the foregoing phoneme obtained from a plurality of speakers, and the input evaluation pattern vector is a power spectrum which is determined from a voice waveform of an unspecified speaker.

3. The method for dynamic programming with the use of learning claimed in claim 1, wherein the path weights are calculated for each lattice point of the accumulated DP path matrix by formula:

$$pW(i,j)=M/[\{DPW(i,j)+K\}/\{DPW(i,1)+DPW(i,2)+\ldots+DPW(i,L)+L\times K\}]$$

where M is a constant (M>0), L and K are constants, $pW(i,j)$ is a path weight, and $DPW(i,j)$ is an element value in an accumulated DP path matrix.

4. The method for dynamic programming with the use of learning claimed in claim 2, wherein the path weights are calculated for each lattice point of the accumulated DP path matrix by formula:

$$pW(i,j)=M/[\{DPW(i,j)+K\}/\{DPW(i,1)+DPW(i,2)+\ldots+DPW(i,L)+L\times K\}]$$

where M is a constant (M>0), L and K are constants, $pW(i,j)$ is a path weight, and $DPW(i,j)$ is an element value in an accumulated DP path matrix.

* * * * *